United States Patent [19]

Linke

[11] 3,763,329

[45] Oct. 2, 1973

[54] FOUR-TRACK MAGNETIC HEAD FOR TAPE RECORDING DEVICES

[76] Inventor: Siegfried Linke, Wilhelm-Mayrstrasse 1c, Munich, Germany

[22] Filed: Sept. 30, 1971

[21] Appl. No.: 185,142

[30] Foreign Application Priority Data

Oct. 5, 1970 Germany .................. P 20 48 868.0

[52] U.S. Cl. 179/100.2 C, 340/174.1 F, 346/74 MC

[51] Int. Cl......... G11b 5/10, G11b 5/20, G11b 5/28

[58] Field of Search ............................ 179/100.2 C; 340/174.1 F; 346/74 MC; 29/603

[56] References Cited

UNITED STATES PATENTS

| | | | |
|---|---|---|---|
| 3,614,339 | 10/1971 | Schneider | 179/100.2 C |
| 3,614,830 | 10/1971 | Bate et al. | 179/100.2 C |
| 3,358,275 | 12/1967 | Schulte | 346/74 MC |
| 2,769,036 | 10/1956 | Selsted | 179/100.2 C |
| 3,064,333 | 11/1962 | Kristiansen et al. | 179/100.2 C |

*Primary Examiner*—Bernard Konick
*Assistant Examiner*—Alfred H. Eddleman
*Attorney*—Fleit, Gipple et al.

[57] ABSTRACT

A four-track magnetic head for tape recording devices, particularly for cassette tape recording devices, which consists of two mainly identically designed housing parts and in which the housing exhibits inside a centre cross-piece being perpendicular to the magnet gaps and one double-track magnet system is pressed onto the centre cross-piece from each side and in which each double-track magnet system contains two magnet coils which are both wound onto a holder which has two square frames at its ends and in which hook-shaped magnetic sheets are inserted with their base legs in the frames.

9 Claims, 7 Drawing Figures

INVENTOR:
Siegfried Linke
BY:
Fleit, Gipple & Jacobson
Attorneys

FOUR-TRACK MAGNETIC HEAD FOR TAPE RECORDING DEVICES

Tape recording devices with four recording tracks afford the advantage that stereo operation is possible in both directions so that there is no need to rewind the tape. The upper tape half is thus played with two tracks in one direction and the lower tape half which likewise bears two recording tracks is played in the other direction. Further, four-track operation, i.e. so-called quadrophony, is also possible, which provides for music reproduction which is superior to records. Experiments have also been made to implement four-track operation with cassette tape recording devices which operate with tapes only 3.81 mm wide. However, it is extremely difficult and expensive to accommodate four independent magnet systems in a greatly restricted space, allowance having to be made for the fact that each magnet system requires a magnet coil with roughly 1,000 to 2,000 turns. Similar problems arise with data processing machines and multi-channel recording and reproducing devices where a very large number of recording tracks has to be accommodated on a tape which may be wider, in which case the width of each recording track is less than 1 mm.

The height and the position of the gaps of the magnet systems must be observed very accurately in order to ensure that the tapes can be changed as required from one device to another. Frequently, recorded cassettes are supplied precisely with cassette tape recording devices. Provision must accordingly be made that the magnet system allocated to the corresponding track coincides exactly with the position of the information track so that re-recordings from one track to another are avoided. The permissible tolerances amount to roughly 0.01 mm. The problem is known by the expression "compatibility" in literature.

Proposals have been made already to cast magnet systems fixed in position in a synthetic resin. However, alterations which may be above the named tolerance limit are caused by ageing, swelling, crack formation and the like in the synthetic resin.

It is the object of the invention to propose a four-track magnetic head, particularly one for cassette tape recording devices, which can be manufactured relatively cheaply with great accuracy and which remains stable within the given tolerance range even for long periods of time. Further, a relatively large space for the magnet coils is to be made available in the magnetic head. Greater inductance and hence greater voltage delivery are obtained on the basis of the installation of magnet coils with optimum dimensions.

Further, it is also the object of the invention to propose a four-track magnetic head in which two housing parts both possess a centre cross-piece running perpendicularly to the gap plane and in which two core packets are grouped together in each case with the associated shield to form a double-track magnetic unit and in which the core packet unit allocated to the upper tape half and the core packet unit allocated to the lower tape half are pressed onto the centre cross-piece from the one side and from the other.

According to a preferred embodiment the magnet systems consist in each case of two packets of sheets which are shaped in outline roughly squarely with sloped backs and which possess a recess roughly in the form of an isosceles, rectangular triangle so that a base leg and a gap leg projecting in a hook-shaped manner therefrom are formed. The two base legs of the packets of sheets facing each other are inserted in a magnet coil which is wound onto a rectangular holder. The holder for the magnet coil consists preferably of two square frames which are arranged parallel to and at a certain distance from each other and which are joined together by means of two rectangular plates opposite each other. The holder can be manufactured in the form of a plastic injection moulded part. Further, preferably the centre cross-piece of the two housing parts contains sheets which serve to provide magnetic shielding or which form a contact to the tape stopping feature.

The method of manufacturing a magnetic head in accordance with the invention consists in the fact that the two housing parts are arranged with the inserted packets of sheets adjacent to each other with their backs on a plane surface, are clamped in an auxiliary device and face-ground. Subsequently, one of the housing parts is placed on the other with the magnet coils in between. Preferably before the face-grinding process, the packets of sheets placed between the housing halves are pressed onto the centre cross-piece by means of pressure pins from both sides. The spaces remaining between the outer cross-pieces and the packets of sheets are filled with a casting resin.

Referring now to the accompanying drawings which serve to provide further explanations on the subject matter of this invention:

Figure 1:
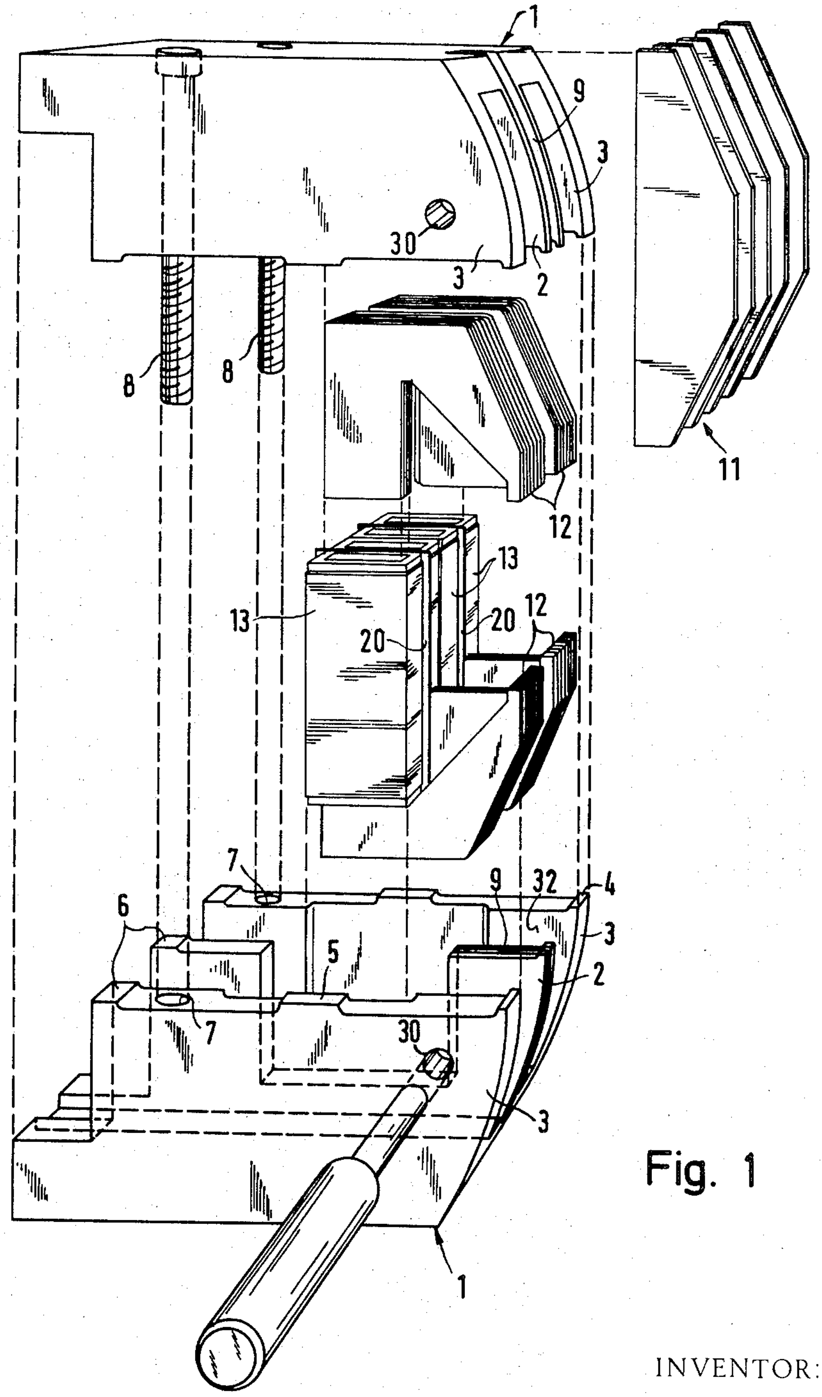
FIG. 1 is a diagrammatic exploded representation of the magnetic head.

With reference to FIG. 1 it can be seen that the magnetic head contains two identical housing parts 1. The housing parts both possess a centre cross-piece 2 and side walls 3, the latter forming the top side and the underside of the magnetic head. The centre cross-piece 2 and the side walls 3 are all provided with a front projection 4. The projections 4 rest on a foil which is not shown and forms the gap. Further, the centre cross-pieces 2 and the side cross-pieces 3 exhibit a centre projection 5 and a rear projection 6. Between the centre projection 5 and the rear projection 6 there is in each case a hole 7 into which connecting screws 8 which hold the two housing parts 1 together are screwed.

The centre cross-piece 2 possesses at its front end a slot 9 into which a packet of sheets 11 is inserted after the head has been assembled. The packet of sheets 11 serves to provide magnetic shielding. Said packet 11 can also be used for automatic tape stopping, which has proven quite expedient. This thus means that, if a conductive automatic stop foil at the end of the tape establishes a short-circuit to the packet of sheets 11 or if the two outer sheets 11 which are insulated from each other by the centre sheet are short-circuited in relation to each other, the tape will be stopped when a relay operates or, if required, there will be a reversal in the direction in which the tape is running. A packet of sheets 12 with the associated magnet coils 13 is inserted in each case in the spaces between the centre cross-piece 2 and side cross-pieces 3.

Figure 3:
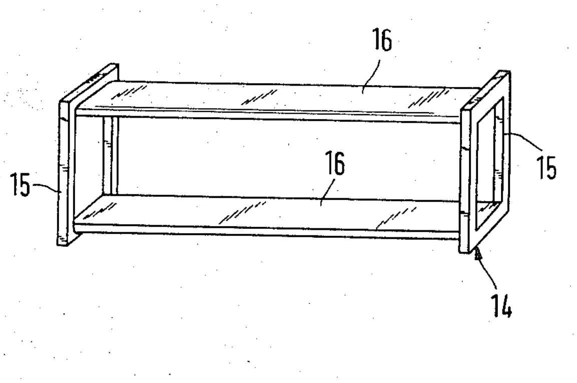
FIG. 3 shows diagrammatically the holder designed in the form of a plastic injection moulded part for the magnet coil.

The magnet coils 13 are wound onto a holder 14 which is shown in FIG.3 and which consists of two square frames 15 which are arranged parallel to and at a certain distance from each other and which are joined together by means of two rectangular plates 16 opposite each other. It has been found that such a holder can be made in the form of a plastic injection moulded part. The holder is an essential element which ensures that magnet coils with 1200 turns and more can be manufactured and accommodated in such a small space. The side length of the frames 15 amounts to roughly 0.7 mm. In order to manufacture the magnet coil, the entire holder 14 is placed on a rotating winding mandrel and the magnet coil is then wound which obtains an exactly rectangular shape in this way.

Figure 2:
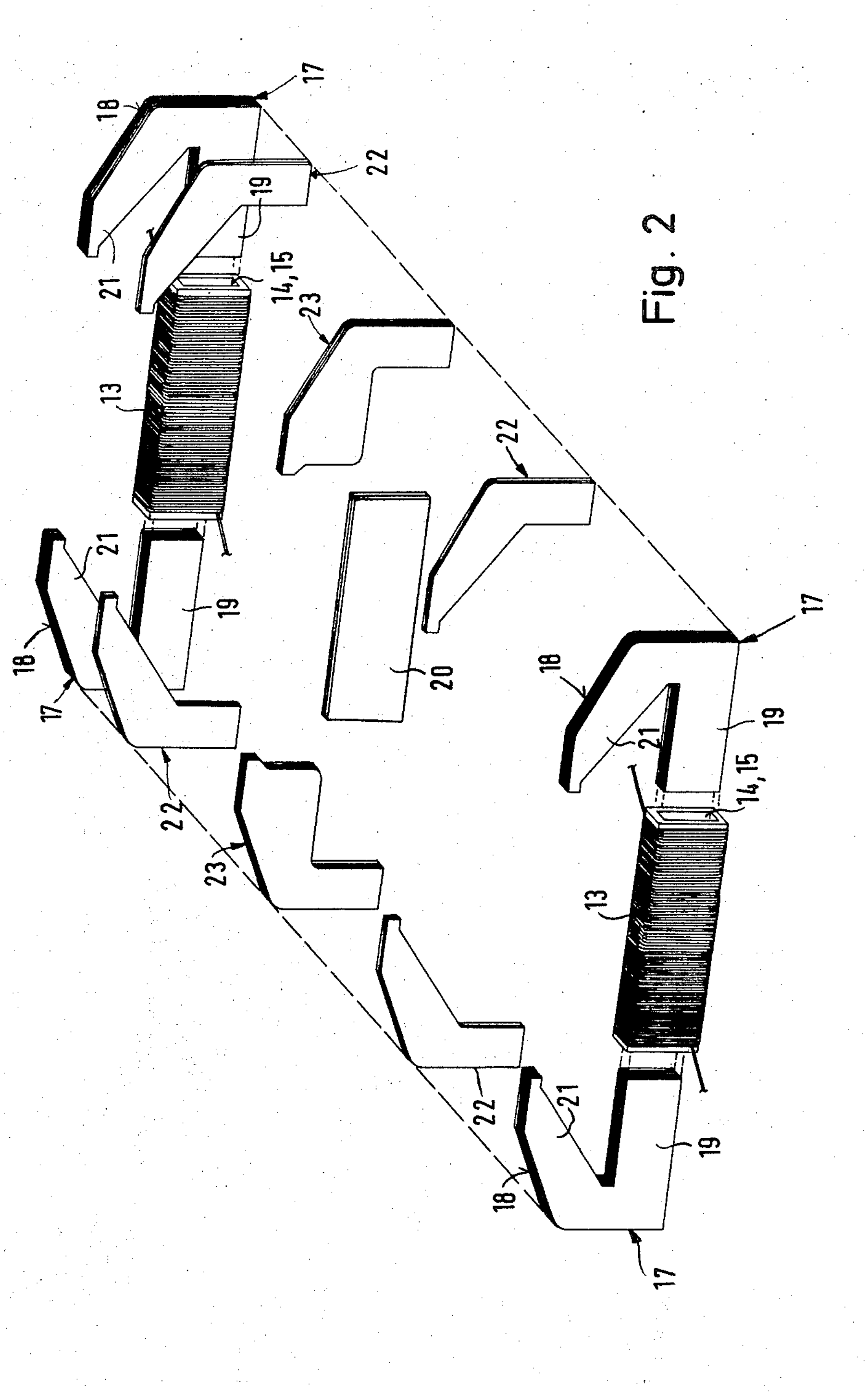
FIG. 2 shows diagrammatically and in an exploded view the arrangement of two magnet coils with their associated packets of sheets.

FIG. 2 shows an exploded representation of a double-track magnetic unit which is inserted in a space between the centre cross-piece 2 and a side cross-piece 3. Several sheets 17 which are shaped in outline roughly squarely with a sloped back 18 and which possess a recess roughly in the form of an isosceles rectangular triangle so that a base leg 19 and a gap leg 21 projecting therefrom in a hook-shaped manner are formed, are inserted with their base legs 19 in the holder 14 of the magnet coil 13. The sheets 17 are followed by two sheets 22 which are shaped in a similar manner to the sheets 17, but are not provided, however, with the base legs 19. In the centre between the two magnet coils 13 there is a shielding packet of sheets 23 which is likewise not provided with the base leg 19, but which possesses, however, a widening covering the triangular recess on the gap leg. After two further sheets 22 have been inserted, there follows a further packet of sheets 17 which is inserted in the second magnet coil 13. The numeral 20 designates a shielding sheet arrangement which is between the magnet coils 13.

Figure 4:
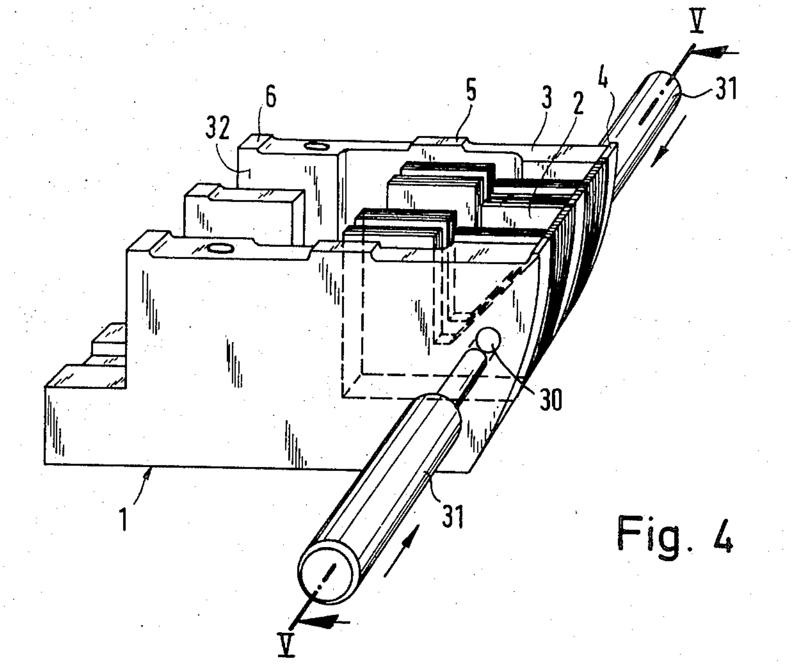
FIG. 4 and 5 show a diagrammatic and sectional view of a process step in the manufacture of the magnetic head.
Figure 5:
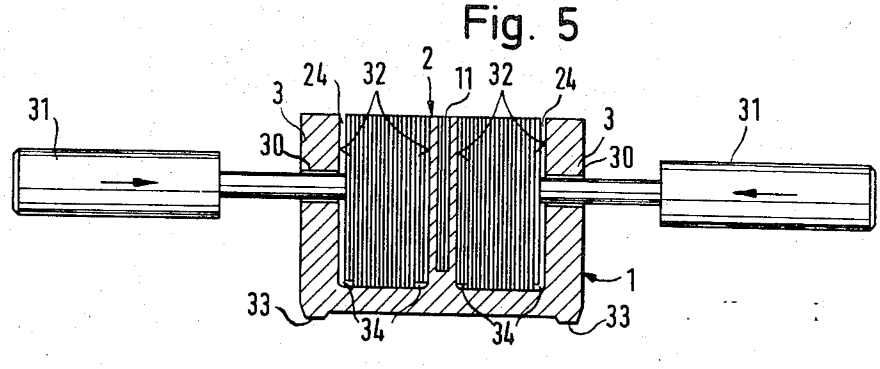
Figure 6:
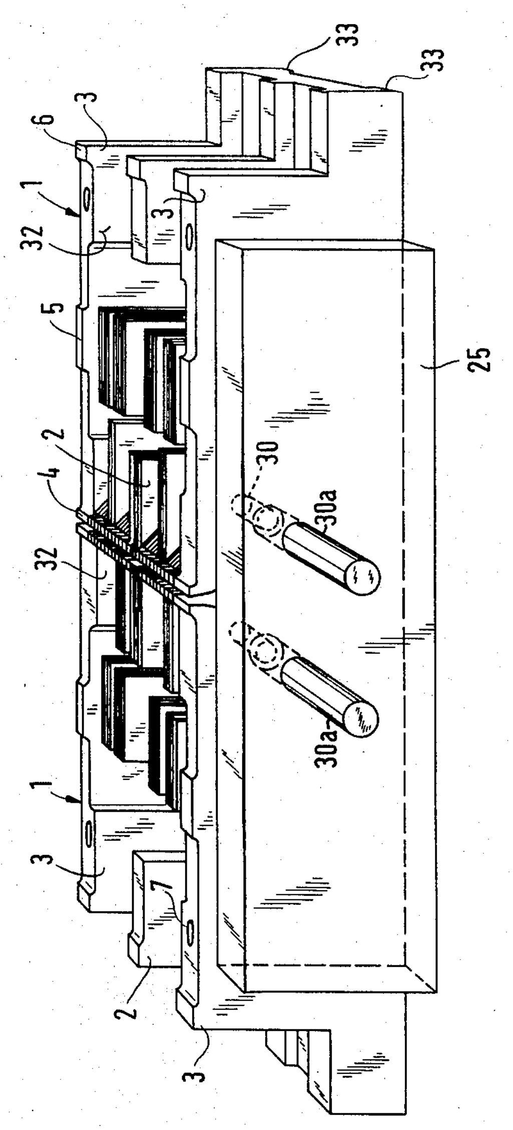
FIG. 6 shows diagrammatically a further process step in the manufacture of the magnetic head.

Details of the manufacture of the magnetic head are shown in FIGS. 4 to 6.

The packets of sheets inserted in the spaces between the centre cross-piece 2 and the side cross-pieces 3 are pressed onto the centre cross-piece 2 by means of pin-shaped auxiliary tools 31 which are inserted in the housing parts through openings 30. The spaces 24 remaining between the packets of sheets and the side cross-pieces 3 are filled with a casting resin. Since the packets of sheets and the magnetically active gaps are thus aligned exactly with respect to position and location in relation to the centre cross-piece 2, maximum possible accuracy is obtained without special treatment, i.e. the magnet systems allocated to the upper and lower tape halves exhibit a quite exact distance from each other which corresponds to the width of the centre cross-piece. If the centre line of the tape is regulated accordingly in relation to the centre cross-piece, it is thus impossible that overcutting can occur between the upper tape half and the lower tape half during the recording or reproducing process.

Figure 7:
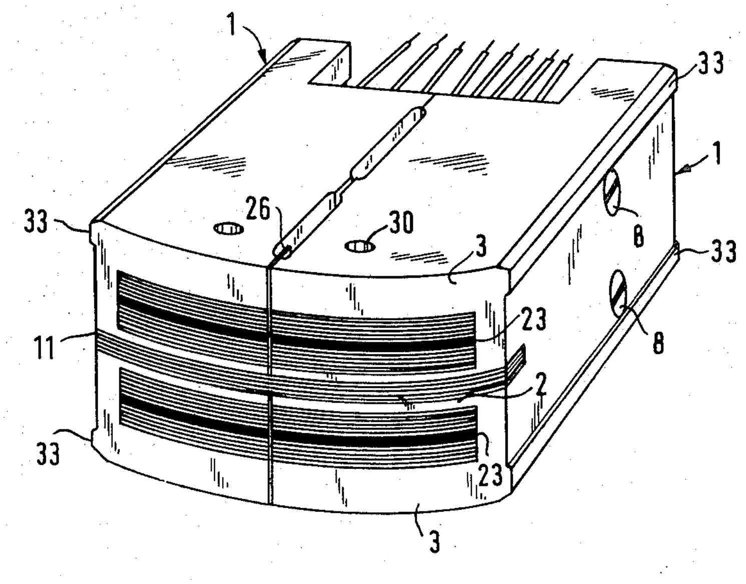
FIG. 7 shows a diagrammatic representation of the finished magnetic head.

As can be seen in FIG.6, the housing parts 1 equipped with the packets of sheets are now clamped into an auxiliary device 25, the two housing parts 1 allocated to each other being adjacent to each other in each case. They are fixed in position by pins **30*a* which are inserted in the openings 30 of the housing parts 1. The auxiliary device 25 is on a plane surface which is at an exact distance from a milling device and a grinding device which are not shown and with which the ducts 32 are ready-milled and ground over the projections 4, 5 and 6 and over the packets of sheets. Afterwards, the two housing parts 1 are folded over with the magnet coils 13 and the gap foil 26 in between and then joined together by means of the connecting screws 8. Surprising accuracy is obtained as a result of the common grinding process and the exact plan position which is automatically obtained here. The finished magnetic head is shown in FIG.7. Owing to the insertion of the gap foil 26 forming the gap, the centre projections 5 are at a small distance from each other whereas the rear projections 6 touch each other. The individual sheets in the magnet systems of the two housing parts 1** are aligned exactly with each other, in contrast to known designs where a stagger which has an extremely disturbing effect on the sound quality cannot be avoided.

FIGS. 5 and 7 show that the corner edges 33 of the housing parts which run perpendicularly to the tape are designed in a projecting and sloped manner. This means on the one hand that there is an improvement in accuracy in pole surface machining and in the tape contact surface with form grinding because statically determined relationships are present upon contact being made. On the other hand, this allows the head to be inserted in an exactly fitting shielding can which is not shown.

The magnetic head designed in accordance with the invention affords the special advantage that its contact surface for the tape is made mainly of the magnetic material, i.e. generally an iron-nickel alloy (Mu-metal) or an iron-aluminium alloy (Vacudur, Alfinol), namely in that on the one hand core packet units which consist of two magnet systems in each case are formed and in that on the other hand sheets 11 are likewise inserted in the centre cross-piece, sheets which consist of the same material. The tape or some other information medium only comes into contact with two narrow cross-pieces (roughly 0.2 mm) of the housing material. In this respect differing abrasion characteristics of the magnetic material and housing material have no disadvantageous effect. The stopping of the tape via the sheets 11 is also certain owing to the uniform wear of the tape contact surface of the magnetic head.

I claim:

1. A four-track magnetic head for tape recording devices comprising two housing parts adapted to house the magnetic systems for said magnetic head, each of said housing parts having a center cross-piece having two spaced-apart contact surfaces, four magnetic systems each consisting of at least one magnet coil and a plurality of magnetic sheets having at least one angular surface and arranged to form a magnetic circuit interrupted by a gap, means for joining two of said magnetic systems into one magnetic unit and the other two of said magnetic systems into another magnetic unit, at least one shielding sheet positioned between and adjacent to each of said magnetic systems, each of said magnetic units and adjacent at least one shielding sheet forming a double-track magnetic unit, and means joining said housing parts such that they contact each other along a plane which is parallel to the plane of said gap and such that said contact surfaces are perpendicular to the plane of said gap, each of said double-track magnetic units lying flush with one of the contact surfaces of each of said center cross-pieces and on opposite sides of the center cross-pieces of each of said housing parts.

2. The magnetic head of claim 1 in which each of said double-track magnetic units comprises a holder on which two magnet coils are wound, said holder comprising two spaced-apart square frames arranged parallel to one another and means connecting said frames.

3. The magnetic head of claim 2 in which said connecting means comprise two spaced-apart rectangular plates attached at their ends to said frames and in which said holder is formed from injection molded plastic.

4. The magnetic head of claim 1 in which an opening is formed in each of said housing parts which is perpendicular to said center cross-pieces and which is adapted to receive an auxiliary tool used in assembling said magnetic head.

5. The magnetic head of claim 2 in which said magnetic sheets are hook-shaped and have a sloped back portion and an isosceles rectangular triangular opening therein and in which each of said magnetic sheets comprises a base leg and a gap leg.

6. The magnetic head of claim 5 in which the base legs of said plurality of hook-shaped magnetic sheets of one of said magnetic systems is inserted in one end of said holder and in which the base legs of said plurality of hook-shaped magnetic sheets of another of said magnetic systems is inserted in the other end of said holder to form said double-track magnetic units.

7. The magnetic head of claim 5 in which said shielding sheets have the same general shape as said hook-shaped magnetic sheets but with said base legs omitted.

8. The magnetic head of claim 1 in which said center cross-pieces of said housing parts have openings therein and in which a plurality of sheets which function to provide magnetic shielding are inserted in said openings.

9. The magnetic head of claim 1 in which said center cross-pieces of said housing parts have openings therein and in which a plurality of sheets which function to form a contact to effect the movement of the tape of said tape recording device are inserted in said openings.

* * * * *